US008545310B2

(12) United States Patent
Fong

(10) Patent No.: US 8,545,310 B2
(45) Date of Patent: Oct. 1, 2013

(54) GAMING SYSTEM AND A METHOD OF GAMING INCLUDING REVEALING WHAT WOULD HAVE BEEN WON

(75) Inventor: Colin Fong, Penshurst NSW (AU)

(73) Assignee: Aristocrat Technologies Australia Pty Limited (AU)

( * ) Notice: Subject to any disclaimer, the term of this patent is extended or adjusted under 35 U.S.C. 154(b) by 155 days.

(21) Appl. No.: 12/894,917

(22) Filed: Sep. 30, 2010

(65) Prior Publication Data

US 2011/0086697 A1 Apr. 14, 2011

(30) Foreign Application Priority Data

Oct. 14, 2009 (AU) ................................ 2009905024

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.

USPC ............................................... 463/25; 463/36

(58) Field of Classification Search

USPC ...................................................... 463/25, 36

See application file for complete search history.

(56) References Cited

U.S. PATENT DOCUMENTS

| | | | | |
|---|---|---|---|---|
| 2005/0272504 | A1 * | 12/2005 | Eguchi et al. | 463/40 |
| 2006/0009284 | A1 * | 1/2006 | Schwartz et al. | 463/30 |
| 2006/0199633 | A1 * | 9/2006 | Iwamoto | 463/16 |
| 2007/0300217 | A1 | 12/2007 | Tunmer et al. | |
| 2008/0051189 | A1 * | 2/2008 | Kido | 463/20 |
| 2008/0139317 | A1 | 6/2008 | Sheikh | |

FOREIGN PATENT DOCUMENTS

| | | | |
|---|---|---|---|
| AU | 2005215457 | A1 | 9/2005 |
| EP | 1150261 | A2 | 10/2001 |
| WO | 2005081101 | A2 | 9/2005 |
| WO | 2005081130 | A1 | 9/2005 |
| WO | 2005081101 | A3 | 3/2006 |
| WO | 2008068522 | A2 | 6/2008 |

OTHER PUBLICATIONS

International Search Report for PCT/GB2005/000610.

* cited by examiner

*Primary Examiner* — William M. Brewster

(74) *Attorney, Agent, or Firm* — McAndrews, Held & Malloy, Ltd.

(57) ABSTRACT

A gaming system comprising: a display comprising a plurality of display portions associated with respective ones of a plurality of gaming devices; and a group game controller arranged to: control the display to display an object as moving between the display portions by displaying the object in individual ones of the display portions; determine display portions at which to display the object in each of a plurality of stopped display states, at least some of which correspond to respective ones a plurality of prizes; control the display to display the object in each stopped display state in the respective determined display portion; and award any prize associated with each stopped display state to a player of the respective gaming device upon at least one eligibility criteria being met in respect of the gaming device.

28 Claims, 10 Drawing Sheets

GAMING SYSTEM AND A METHOD OF GAMING INCLUDING REVEALING WHAT WOULD HAVE BEEN WON

RELATED APPLICATIONS

This application claims priority to, and is a non-provisional of, Australian Application No. 2009905024, having a filing date of Oct. 14, 2009, which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention relates to a gaming system and a method of gaming.

In some gaming systems, a player of an individual gaming machine can qualify to play a bonus game conducted by another gaming apparatus. For example, a particular gaming outcome may entitle the player to the bonus game.

In other gaming systems a plurality of players may qualify to play a bonus game where players compete against one another, with one or more players receiving an award based on their placing in the bonus game.

While such gaming systems provide players with enjoyment, a need exists for alternative gaming systems in order to maintain or increase player enjoyment.

BRIEF SUMMARY OF THE INVENTION

In a first aspect, the invention provides a gaming system comprising:

a display comprising a plurality of display portions associated with respective ones of a plurality of gaming devices; and a group game controller arranged to:

control the display to display an object as moving between the display portions by displaying the object in individual ones of the display portions;

determine display portions at which to display the object in each of a plurality of stopped display states, at least some of which correspond to respective ones a plurality of prizes;

control the display to display the object in each stopped display state in the respective determined display portion; and award any prize associated with each stopped display state to a player of the respective gaming device upon at least one eligibility criteria being met in respect of the gaming device.

In an embodiment, at least one eligibility criteria comprises the gaming device being active.

In an embodiment, the at least one eligibility criteria comprises a qualifying wager being made at the gaming device.

In an embodiment, each display portion comprises a sub-portion in which the object is displayed when moving, the sub-portion display being independent of display of a game playable with the respective gaming device.

In an embodiment, display of the object replaces display of the game playable with the gaming device when the object is stopped.

In an embodiment, the display portions are provided by individual displays of the plurality of gaming devices.

In an embodiment, the gaming system comprises a music source connected to at least one speaker, and wherein the group game controller is arranged to control the music source to output music via the at least one speaker while the object is moving.

In an embodiment, each stopped display state comprises a pair of sub-states, a conceal state which is displayed initially and a reveal state which is displayed to reveal any prize.

In an embodiment, the object is a parcel and the conceal state corresponds to a layer of wrapping and the reveal state corresponds to the wrapping being removed.

In an embodiment, the group game controller is arranged to determine display portions at which to display the object in stopped display states based on data communicated from one or more of the gaming devices.

In an embodiment, the group game controller comprises a random number generator and is arranged to randomly determine display portions at which to display the object in stopped display states with the random number generator.

In a second aspect, the invention provides a method of gaming comprising:

controlling a display comprising a plurality of display portions associated with respective ones of a plurality of gaming devices to display an object as moving relative to the display portions by displaying the object in individual ones of the display portions;

determining display portions at which to display the object in each of a plurality of stopped display states, at least some of which correspond to respective ones a plurality of prizes;

controlling the display to display the object in each stopped display state in the respective determined display portion; and awarding any prize associated with each stopped display states to a player of the respective gaming device upon an eligibility criteria being met in respect of the gaming device.

In an embodiment, the at least one eligibility criteria comprises the gaming device being active.

In an embodiment, the at least one eligibility criteria comprises a qualifying wager being made at the gaming device.

In an embodiment, each display portion comprises a sub-portion and the method comprises displaying the object in the sub-portion when moving and displaying the object in the sub-portion display independently of display of a game playable with the respective gaming device.

In an embodiment, the method comprises replacing display of the game playable with the gaming device when the object is stopped.

In an embodiment, the method comprises controlling a music source to output music via at least one speaker while the object is moving.

In an embodiment, the method comprises displaying the stopped object initially in a conceal and subsequently displaying the object in a reveal state to reveal any prize.

In an embodiment, the method comprises determining display portions at which to display the object in stopped display states based on data communicated from one or more of the gaming devices.

In an embodiment, the method comprises randomly determining display portions at which to display the object in stopped display states.

In a third aspect, the invention provides a group game controller for a gaming system, the group game controller comprising:

a display controller arranged to control a display comprising a plurality of display portions associated with respective ones of a plurality of gaming devices the display to display an object as moving relative to the display portions by displaying the object in individual ones of the display portions;

a stop position determiner arranged to determine display portions at which to display the object in each of a plurality of stopped display states, at least some of which correspond to respective ones a plurality of prizes, the display controller further arranged to control the display to display the object in each stopped display state in the respective determined display portion; and a prize awarder arranged to award any prize associated with the stopped display states to a player of the respective gaming device upon an eligibility criteria being met in respect of the gaming device.

In an embodiment, the at least one eligibility criteria comprises the gaming device being active.

In an embodiment, the at least one eligibility criteria comprises a qualifying wager being made at the gaming device.

In an embodiment, the group game controller comprises a music source connected to at least one speaker, and the group game controller is arranged to control the music source to output music via the at least one speaker while the object is moving.

In an embodiment, the group game is arranged to determine display portions at which to display the object in stopped display states based on data communicated from one or more of the gaming devices.

In an embodiment, the group game controller comprises a random number generator, the group game controller arranged to randomly determine display portions at which to display the object in stopped display states with the random number generator.

In a fourth aspect the invention provides computer program which when executed implements the method.

In a fifth aspect the invention provides a computer readable storage medium comprising the program code.

BRIEF DESCRIPTION OF SEVERAL VIEWS OF THE DRAWINGS

An exemplary embodiment of the invention will now be described with reference to the accompanying drawings in which.

DETAILED DESCRIPTION OF THE INVENTION

Overview of Exemplary Gaming System

Figure 1:
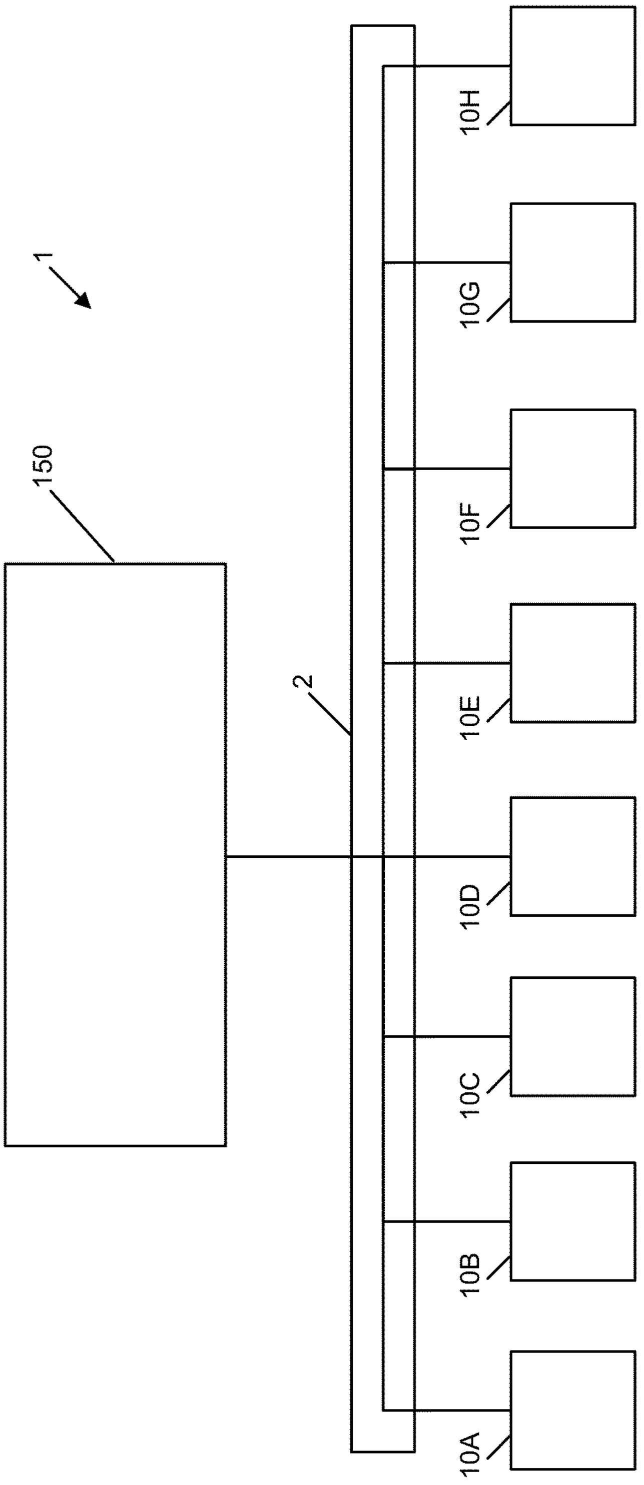
FIG. 1 is a block diagram of a gaming system with a group game controller.
Figure 11A:
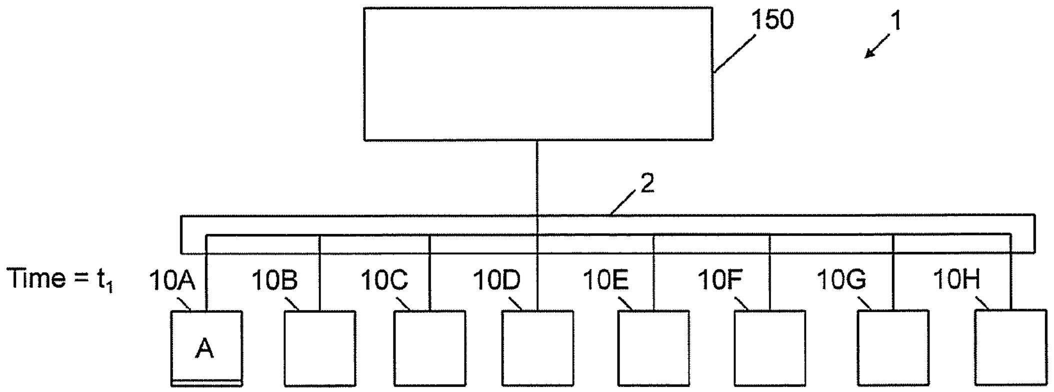
FIGS. 11A, 11B and 11C show an object A stopped at different times at different gaming machines.
Figure 11B:
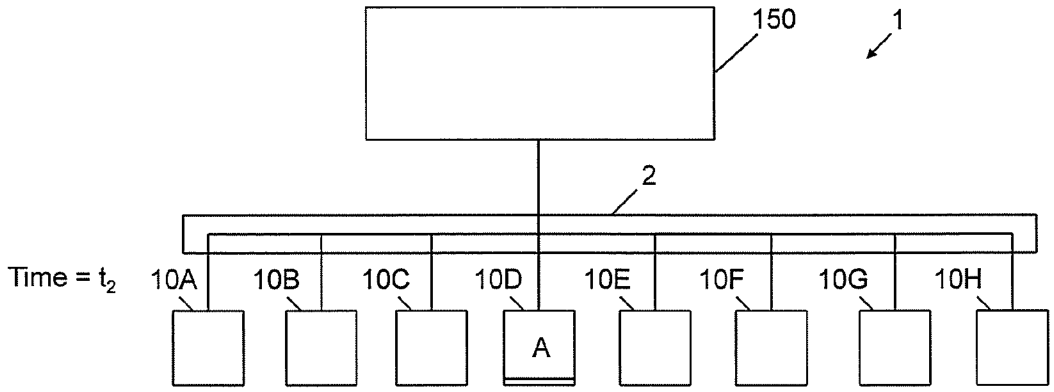
Figure 11C:
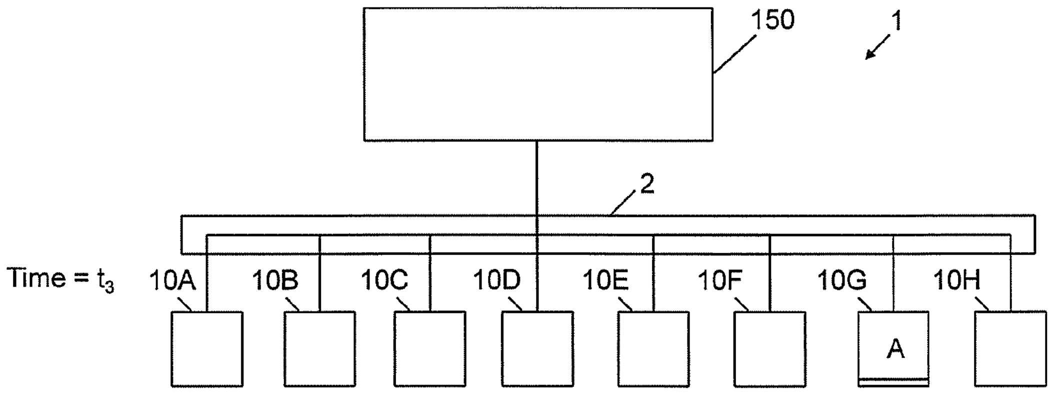

FIG. 1 shows an exemplary gaming system 1 where a group game controller 150 is in data communication over a network 2, such as an Ethernet, with a bank of eight gaming devices in the form of standalone gaming machines 10. The group game controller 150 is arranged, when a moving object feature is active, to control the gaming devices 10 so as to display an object as moving between display portions associated with them, to determine at which of the display portions to display the object in a stopped state, and to award any prize associated with the stopped state. In an embodiment, the display portions are provided by the displays of the gaming devices and the object is displayed in a sub-portion of the display, e.g. the top right corner, while the object is moving, so as not to interfere with play of a game on the gaming device and, when stopped takes over the display from the game being played on the gaming device (this may not occur until an appropriate juncture, such as completion of a spin or play of the game). As shown in FIGS. 11A, 11B, and 11C, the object is represented by the letter "A." In FIG. 11A, the object A appears on gaming machine 10A at time $t_1$. The object A then moves to each of the displays of gaming machines 10A to 10H as determined by the game controller 150. The object A is shown in FIG. 11B at gaming machine 10D at time $t_2$ and shown in FIG. 11C at gaming machine 10G at time $t_3$. The object has pairs of stopped display sub-states: a conceal state and a reveal state. The object is initially displayed in the conceal state and then modified to be displayed in a reveal state which indicates whether the player has won a prize. In an embodiment, the object is a virtual parcel having plural layers of virtual wrapping paper such that there may be prizes between the layers of wrapping paper and a grand prize is revealed by the last layer of paper.

While, the group game controller 150 is shown in FIG. 1 as a separate entity to the gaming devices 10. In an alternative embodiment, it could be provided by one of the gaming devices incorporating a server module arranged to implement the group game controller in the manner described in Australian patent application 2008205413 filed 13 Aug. 2008.

Gaming Devices

Gaming devices capable of participating in the method of gaming of the embodiment can take any suitable form including stand alone gaming machines and server based gaming terminals.

Figure 2:
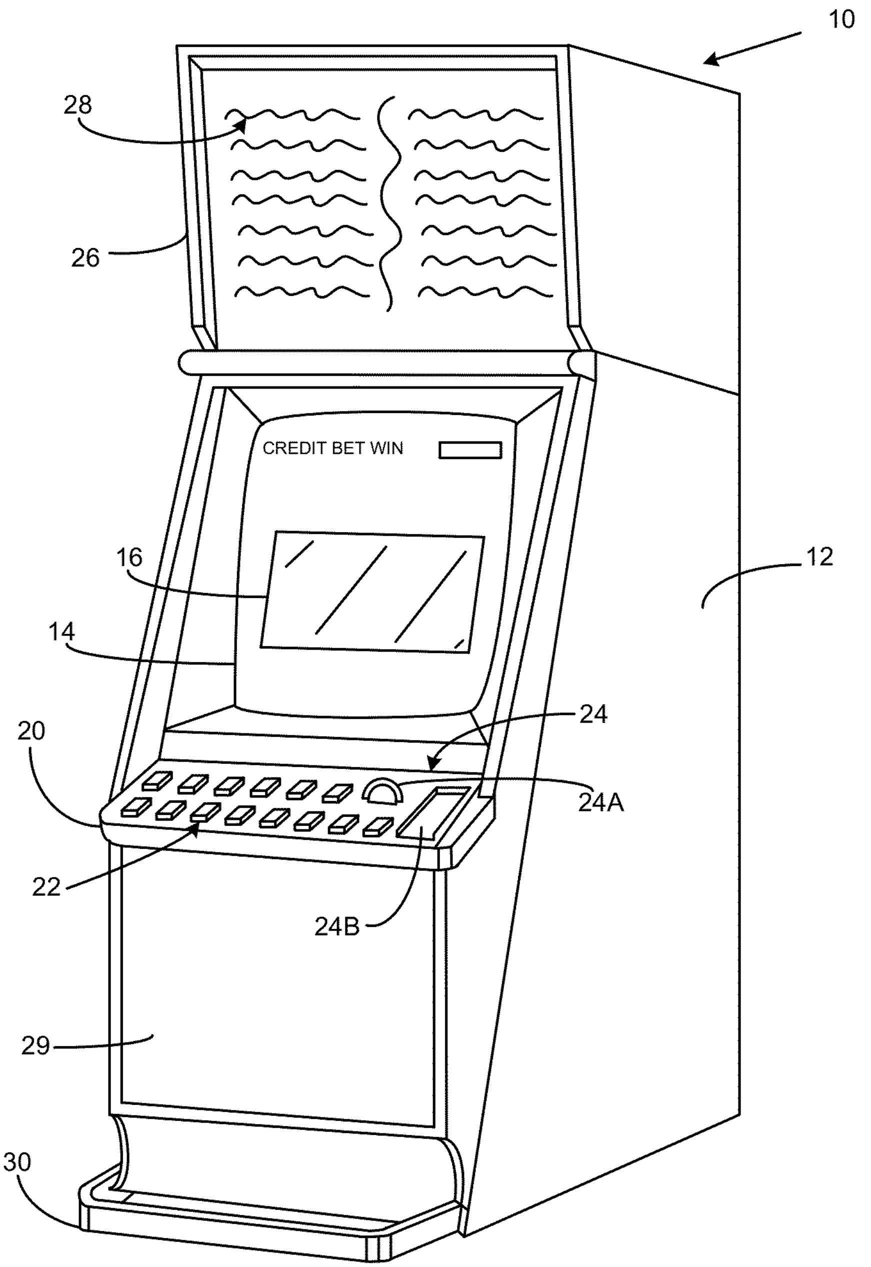
FIG. 2 is a perspective view of a stand alone gaming machine.

A gaming device in the form of a stand alone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. Other gaming machines may be configured for ticket in that they have a ticket reader for reading tickets having a value and crediting the player based on the face value of the ticker. A player marketing module (not shown) having a reading device may also be provided for the purpose of reading a player tracking device, for example as part of a loyalty program. The player tracking device may be in the form of a card, flash drive or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
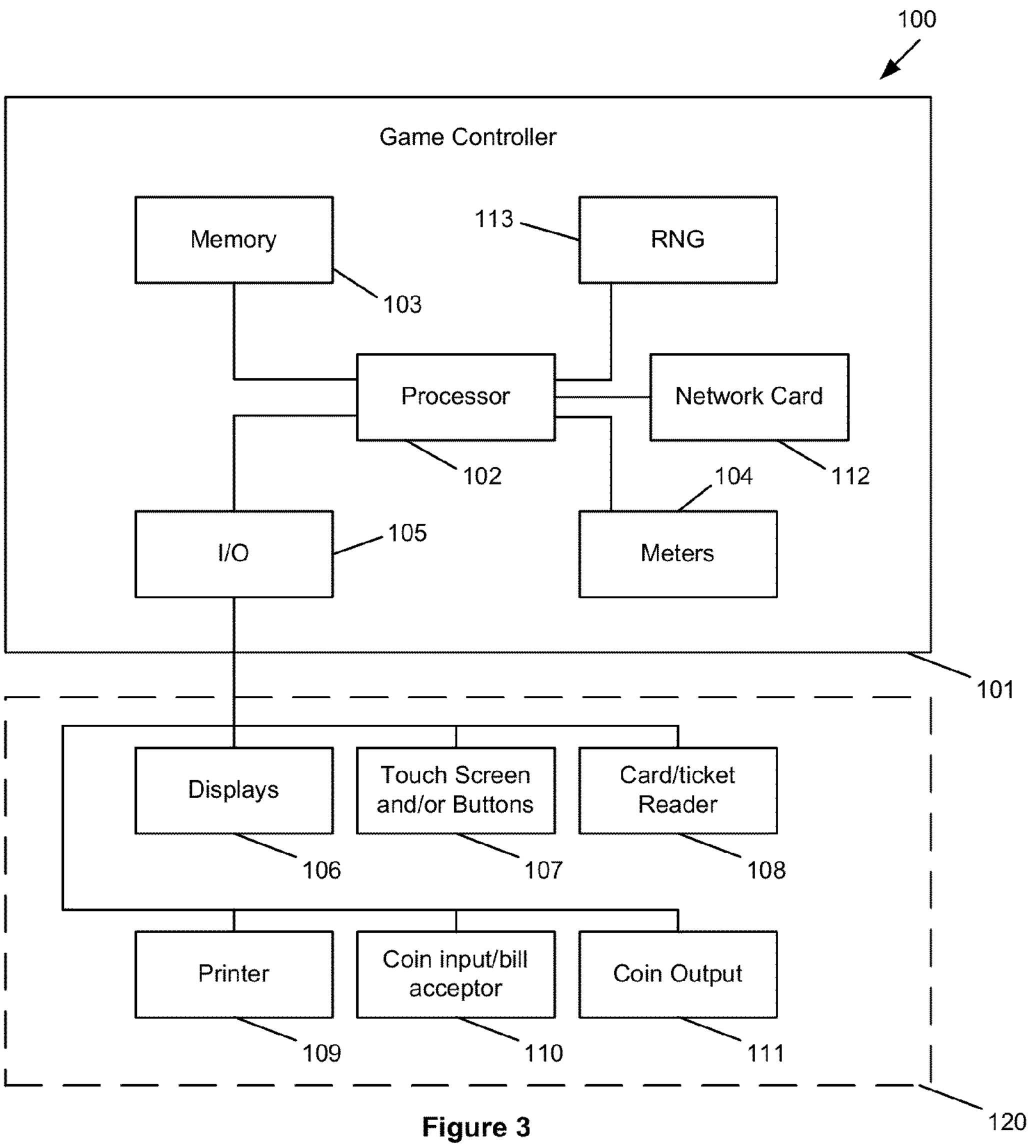
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102 mounted on a circuit board. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 including one or more displays 106, a touch screen and/or buttons 107 (which provide a game play mechanism), a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation. For example, while buttons or touch screens are typically used in gaming machines to allow a player to place a wager and initiate a play of a game any input device that enables the player to input game play instructions may be used.

In addition, the gaming machine 100 may include a communications interface, for example a network card 112. The network card may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of the gaming machine.

Figure 4:
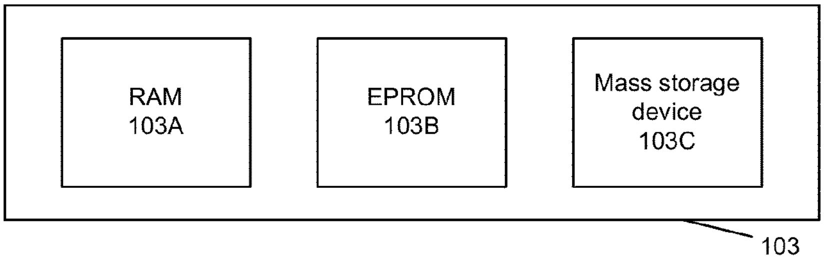
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 1038 or elsewhere.

It is also possible for the operative components of the gaming machine 100 to be distributed, for example input/output devices 106,107,108,109,110,111 to be provided remotely from the game controller 101.

In a client server architecture a gaming device is provided by a gaming client and game server (and optionally other gaming network components). A gaming client has a similar outward appearance to gaming machine 10 but the game server implements most or all of the game and as such acts as the game controller while the terminal operated by the player essentially provides only the player interface. The gaming terminal receives player instructions, pass these to the game server which will process them and return game play outcomes to the gaming machine for display. Further details of a client/server gaming architecture can be found in WO 2006/052213 and PCT/SE2006/000559, the disclosures of which are incorporated herein by reference. In such an embodiment, a group game controller can be provided, for example, by a dedicated server in data communication with the game server.

Figure 5:
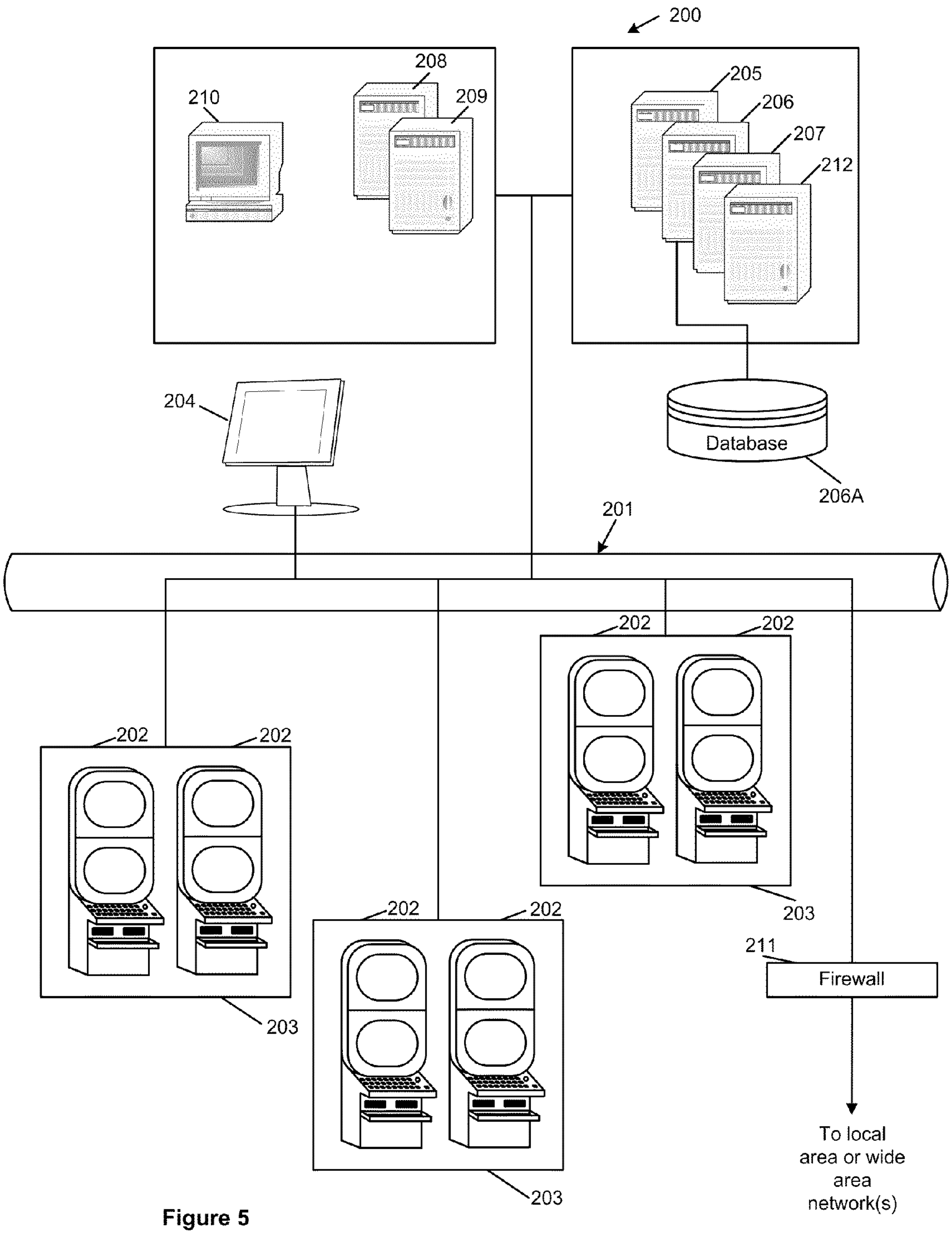
FIG. 5 is a schematic diagram of a network gaming system.

FIG. 5 shows that a gaming device may be connected within a gaming network 200 which provides additional and/or enhanced functionality. The gaming network 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

A group game controller can be provided within such a network 200 as a group game server 205, such that the group game server may implement a group game for a plurality of different banks of gaming machines rather than a specific controller being provide for each bank of gaming machines.

A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming network 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Further Detail of Gaming System

Figure 6:
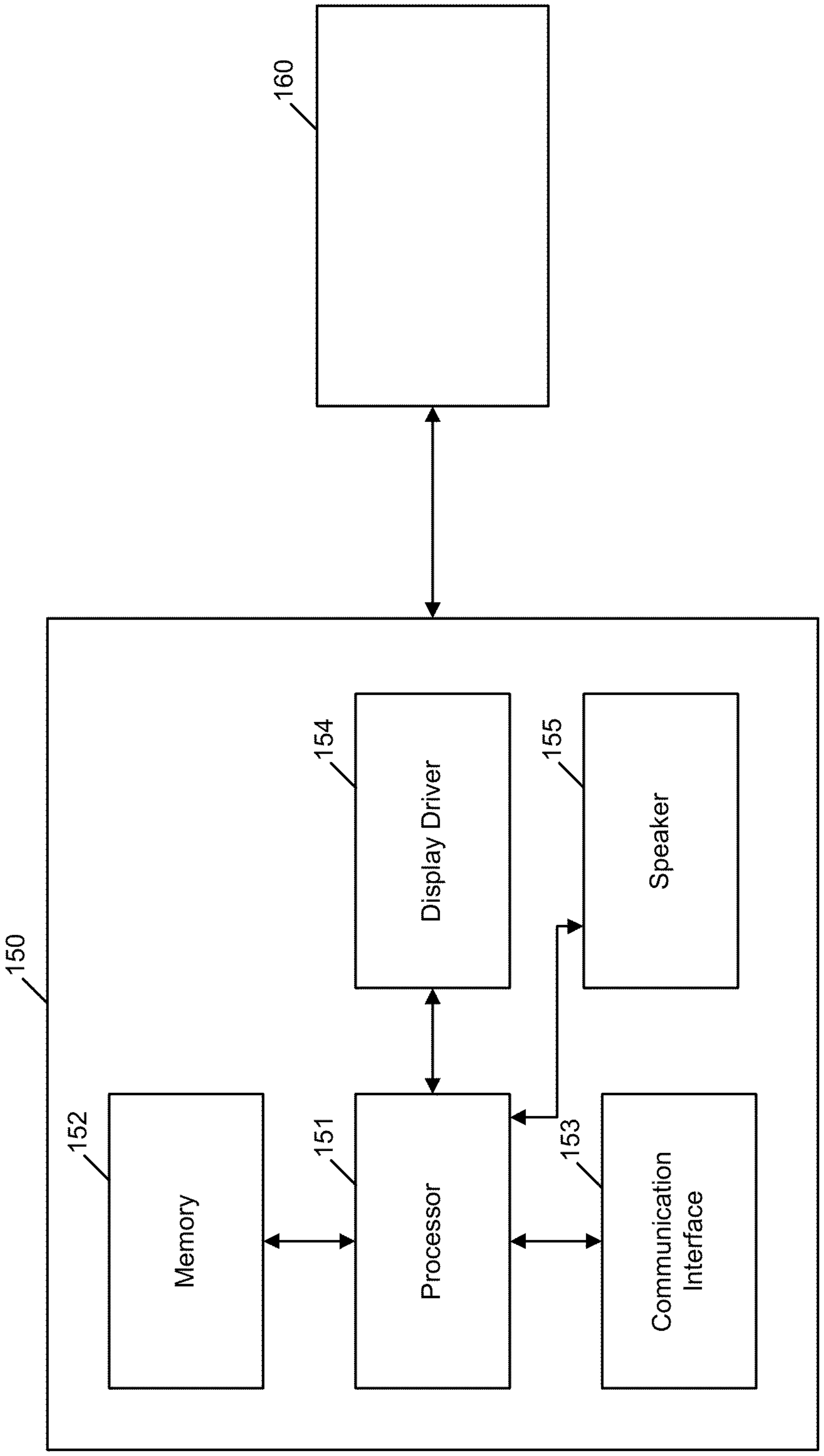
FIG. 6 is a block diagram of a group game controller.

Referring to FIG. 6, the constitution of the group game controller 150 is similar to that of the gaming device illustrated in relation to FIGS. 2 to 4 and 9 (below) in that it has a processor 151 arranged to implement the group game based on program code stored in memory 152 and a display driver 154 for driving the display 160 to show group game outcomes. The group game controller also has a speaker 155 for playing music during the moving object feature. The group game controller 150 also includes a communication interface 153 which enables the processor 151 to communicate with each of the gaming devices 10.

Persons skilled in the art will appreciate the above components are the core components for implementing a group game but other components may be present in a group game controller. Persons skilled in the art will appreciate that the implementation of the group game controller is analogous to the implementation of bonus game controllers in existing gaming systems and reference may be made to such controllers for further details of implementation.

Figure 7:
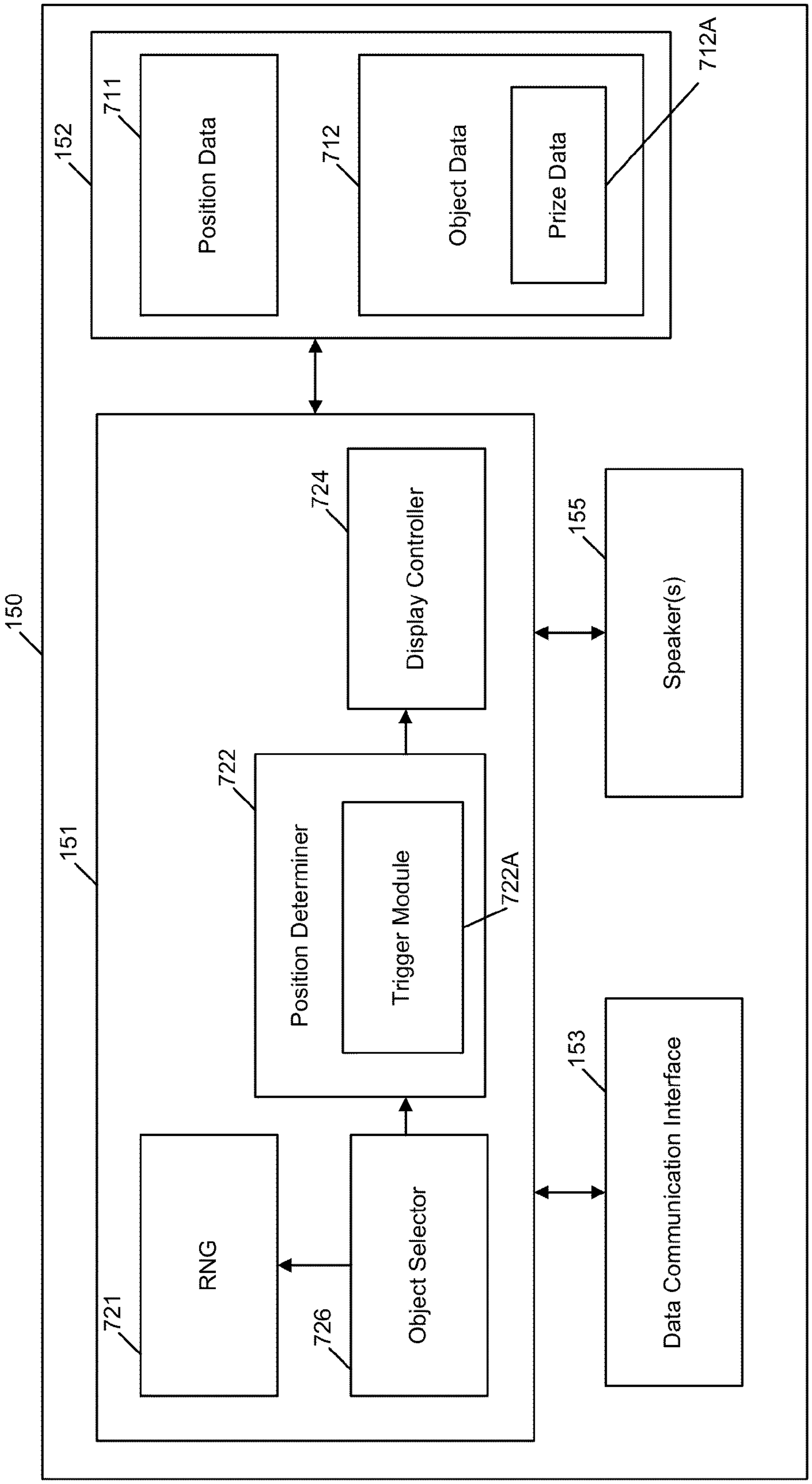
FIG. 7 is a functional block diagram of a group game controller.

FIG. 7 is a functional block diagram of the group game controller 150 which shows that the processor 151 implements a number of modules by executing program code stored in memory 152. In the embodiment, the moving object feature is intended to be active all the time such that the moving object feature is carried out while players play individual gaming devices. At start up or after a grand prize is won, the object selector 726 uses random number generator 721 to select an object. In the embodiment, each object is a parcel and the object selector randomly selects an object based on rules stored as object data which determine factors including: the minimum and maximum number of layers (and hence how many times the object will be stopped before a grand prize is won), the probability of a layer including a prize, a prize range for between layer prizes, and a prize range for the (last layer) grand prize. In other embodiments, the objects may be predetermined and either selected at random or taken from a list. Each prize may be any suitable award known to persons skilled in the art such as an award of wagerable credits, loyalty points, an instrument exchangeable for cash, services or goods, etc.

Figure 10:
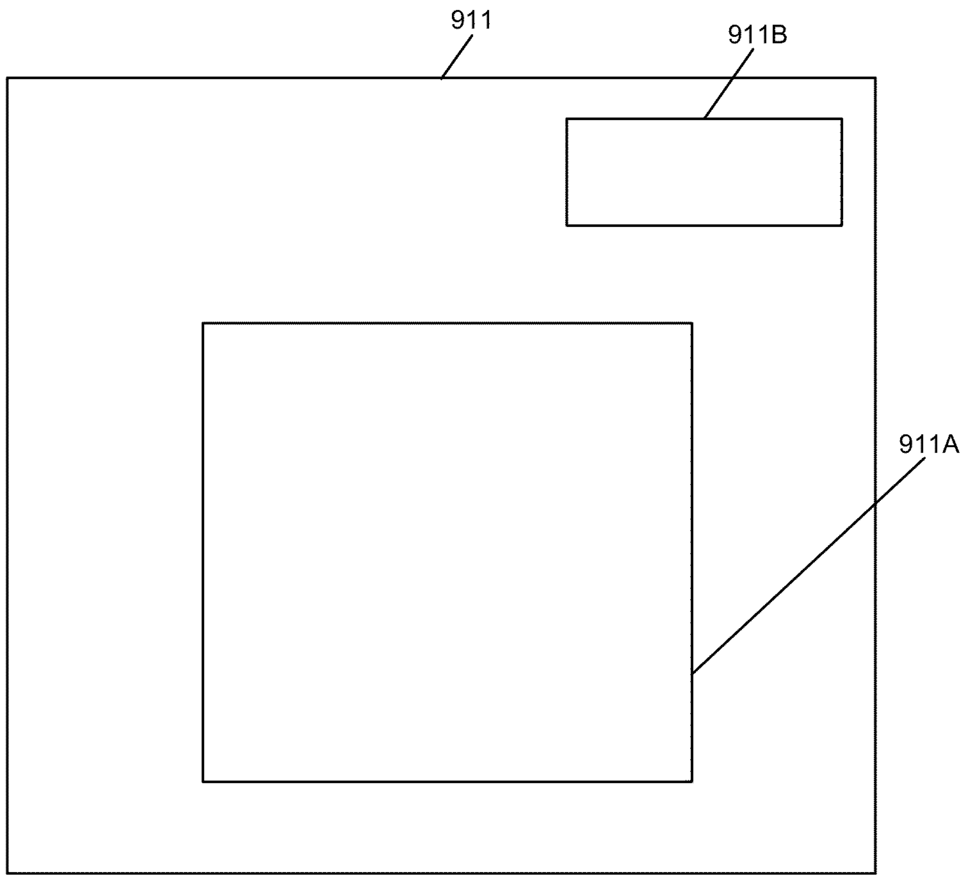
FIG. 10 shows an exemplary display arrangement.

Display controller 724 controls the displays of gaming devices to display the object at each of a plurality of gaming devices 10 in turn. FIG. 10 shows an example of a video display 911 having a game display area 911A where, in one example, virtual reels of a spinning reel game are shown as spinning and a moving object display area 911B which shows the moving object when it is the gaming devices turn. Area 911B can be blank or have some other graphic when there is no object (i.e. when the object is displayed on another gaming device). Display controller 724 communicates via communication interface 153 with the gaming devices 1/0 to cause them to display the object in turn at display sub-portion 911B so that the object appears to be passed from one gaming device 10 to another. The order in which the object is passed is determined based on the physical position of the gaming devices relative to one another and is configured by a technician allocating each device an identifier in an appropriate order during installation.

Display controller 724 keeps the object in motion until a trigger module 720 receives a trigger signal via data communication interface 153.

In this respect, as will be described in further detail below, the gaming devices 10 are individually arranged to determine whether they can trigger a stopping of the object. Accordingly, the trigger module 720A receives a trigger signal via the data communication interface 153 which identifies the gaming device 10 that has triggered. The position determiner 722 uses this information to determine the position at which the object is to be stopped. Accordingly, in this embodiment the position determiner 722 instructs the display controller 724 to stop the object in a concealed state at the identified gaming device and to instruct that gaming device 10 to carry out an object revealing display. In this respect, the display controller 724 communicates the prize which is to be displayed based on prize data 712A of the object data 712 of the object of this game. Display controller 724 also causes the speaker 154 to fall silent. If sound is reproduced at individual gaming machines, the individual gaming machines also fall silent.

In this respect, music for output on the speakers 155 is provided from music source 725. When the prize has been displayed as will be described in further detail below, the display controller 724 restarts display of the object as moving.

Figure 9:
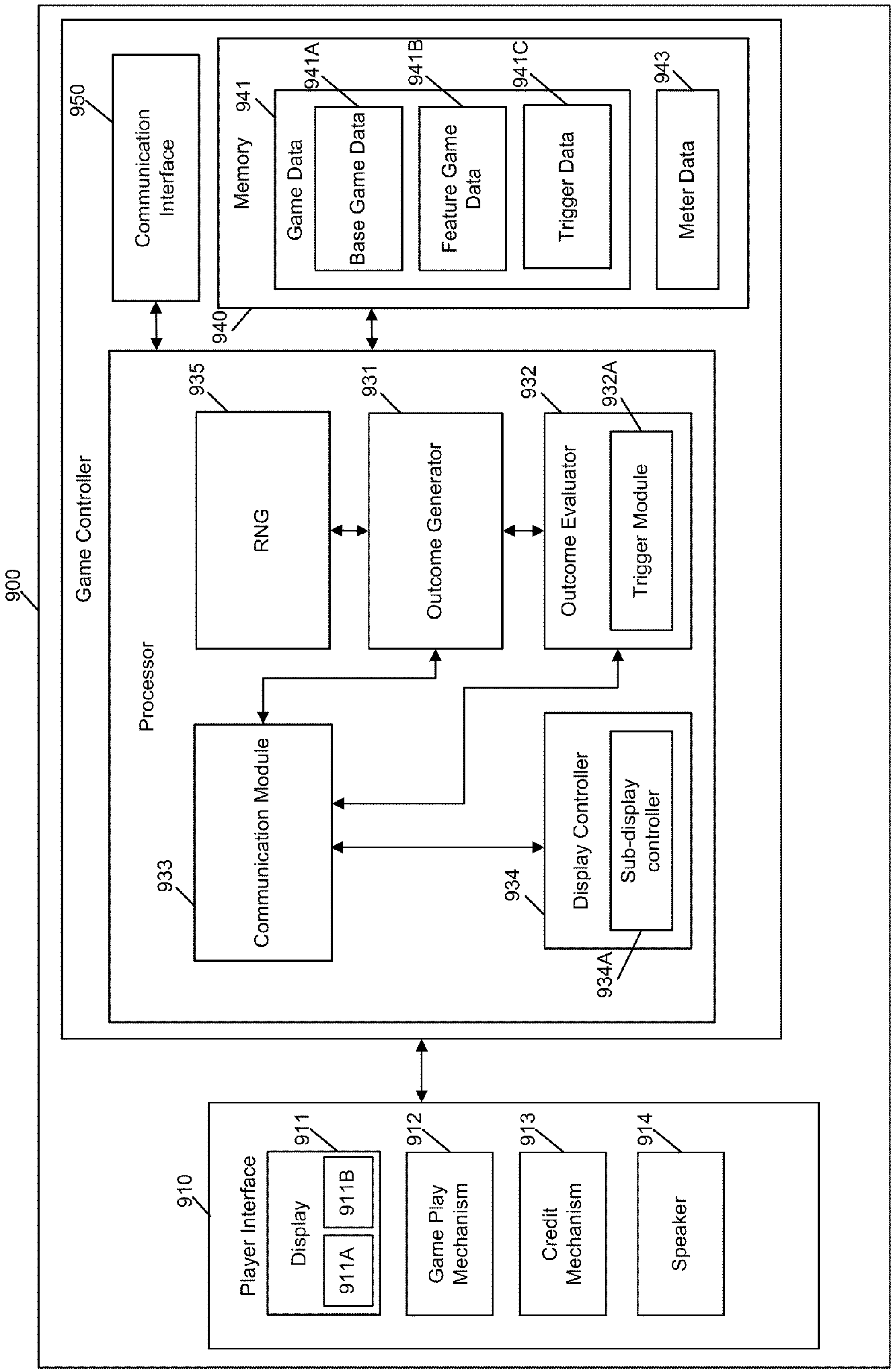
FIG. 9 is a functional block diagram of a gaming device in the form of a standalone gaming machine.

FIG. 9 is a functional block diagram of one example of a gaming device in the form of a stand alone gaming machine. Each gaming device 900 has a communication interface 950 for receiving communications from the group game controller in relation to display of the moving object and awarding of a prize as necessary. The gaming device 900 may be the same or different to gaming machine 10,100 described above. In FIG. 9, the processor 930 of game controller 920 is shown implementing a number of modules based on program code and data stored in memory 940. Persons skilled in the art will appreciate that various of the modules could be implemented in some other way, for example by a dedicated circuit.

The gaming device 900 includes a player interface 910 has a display 911 having a main display area (sub-portion) 911A and a moving object display area 911B (sub-portion) which displays the moving object when it is moving. Gaming device 900 also has a game play mechanism 912 including input devices such as touch screen or buttons to enable the player to interact with the game by placing wagers and entering any other instructions required to play the game. Game play mechanism 912 also enables the player to interact with the game to learn game rules etc. The player interface 910 includes a credit mechanism 913 allowing the player to input credit into the gaming device 900 and/or be paid out any winnings or remaining credit. A person skilled in the art will appreciate that other components will be present in a gaming device 900 such as those described in relation to FIGS. 2 to 4 above. The memory 940 includes program code for implementing a game data 941 for implementing one or more portions of the game depending on how a specific play of the game progresses.

The processor 930 when executing the program code stored in memory 940 is arranged conduct a play of the game in response to the operation of the game play mechanism 912.

In each play of the game, a base game is conducted based on base game data 941A. Outcomes of the base game are generated with the outcome generator 931. The outcome evaluator 932 evaluates the game outcomes that are generated based on the wager specified with the game play mechanism 912 and updates meter data 942 as necessary. In the embodiment, at least one outcome of the base game result in a feature game 941B being conducted.

In the illustrated embodiment, the outcome evaluator 932 also includes a trigger module 932A. This module determines whether an outcome of a game entitles the player to opening of the parcel. If the player is entitled to open the parcel, the trigger module passes the trigger via communication module 933 and communication interface 950 to the group game controller 150 which operates to stop the parcel as described above.

While the object is being displayed as moving, the individual gaming device 900 receives data by communication 950 instructing the game controller 920 to display the parcel. In this respect communication module 933 routes a display communication to display controller 934. Display controller 934 includes sub display controller 934A which controls the sub display 911B to display the moving object during the moving object stage of the game. The sub-display controller 934A is arranged to display the object for preconfigured period of time, for example, 5 seconds.

When a prize is to be awarded, to the gaming device, the details of the prize are received by communication interface and communication module 933 and passed to display controller 934 which waits for a configured pause in the game, such as completion of the current spin and then controls the whole of the display 911 to display the prize revealed such that it takes over the portion of the display 911A where outcomes of the game are normally displayed. The parcel is first displayed in a wrapped or conceal state and then is graphically unwrapped to display it in a reveal state by the display controller 934. In this respect, the relevant graphics can be stored in memory 940 or communicated over the network of the game controller 920 from the group game controller 150.

In addition to the above, the game controller 920 may incorporate an eligibility module 936 to enforce eligibility rules in respect of the game. The eligibility rules can be based on known eligibility factors including that a bet is being placed within a defined time period, a bet of a certain type has been placed in a certain time period, the player is playing a certain number of lines etc.

In other embodiments the eligibility module 936 may communicate with the group game controller in respect of the eligibility and this eligibility may be used to control display of the object. For example, the object may be shown as moving only to those machines which are eligible.

It will also be appreciated from FIG. 9 that the player interface may incorporate a speaker 914 for outputting the music while the object is moving. This music can be communicated from music source 725 over the network or can be generated locally at the gaming device.

Persons skilled in the art will appreciate that there may be a number of variations on the above embodiment, for example, the object moving feature may be triggered by a factor such as a trigger occurring on an individual game or by a turnover of the group of machines that are connected to the controller or the turnover of individual game machines. Further, a trigger for triggering the game which is derived at the gaming device can be based on other factors, such as turnover of the gaming machine, a random calculation calculator of the gaming machine etc. In other embodiments, the trigger may be determined by trigger module 720 at the game controller 150 for example by obtaining a random value from random number generator 721.

In other embodiments, while the trigger may cause all prizes to be distributed. For example, if the trigger is that a certain turnover value is reached for all the linked gaming machines, the group game controller may use random number generator 721 to randomly determine positions at which each of the prizes of the object are to be awarded. That is, the position determiner, 722 may include a routine for randomly determining the gaming devices at which the awards are to be made. The parcel is then shown as moving from gaming machine to gaming machine and stopped based on the determined positions until all of the prizes have been awarded. In this embodiment, the grand prize corresponding to the last layer of wrapping removed from the virtual parcel may be awarded at random, or, for example to the gaming machine which caused the turnover to reach a certain point. In this example, the other prizes may be awarded at random.

In the above embodiment the base game conducted is a conventional spinning reel type game. In such embodiments, the evaluation entitlement may be based on how many lines are played in each game. Such win lines are typically formed by a combination of symbol display positions, one from each reel, the symbol display positions being located relative to one another such that they form a line.

In many games, the win entitlement is not strictly limited to the selected win lines for example, "scatter" pays are awarded independently of a players selection of pay lines and are an inherent part of the evaluation entitlement.

Persons skilled in the art, will appreciate that in other embodiments, an evaluation entitlement may be based on a number of reels to play such as in games are marketed under the trade name "Reel Power" by Aristocrat Leisure Industries Pty Ltd. The selection of the reel means that each displayed symbol of the reel can be substituted for a symbol at one or more designated display positions. In other words, all symbols displayed at symbol display positions corresponding to a selected reel can be used to form symbol combinations with symbols displayed at a designated, symbol display positions of the other reels. For example, if there are five reels and three symbol display positions for each reel such that the symbol display positions comprise three rows of five symbol display positions, the symbols displayed in the centre row are used for non-selected reels. As a result, the total number of ways to win is determined by multiplying the number of active display positions of each reel, the active display positions being all display positions of each selected reel and the designated display position of the non-selected reels. As a result for five reels and fifteen display positions there are 243 ways to win.

Figure 8:
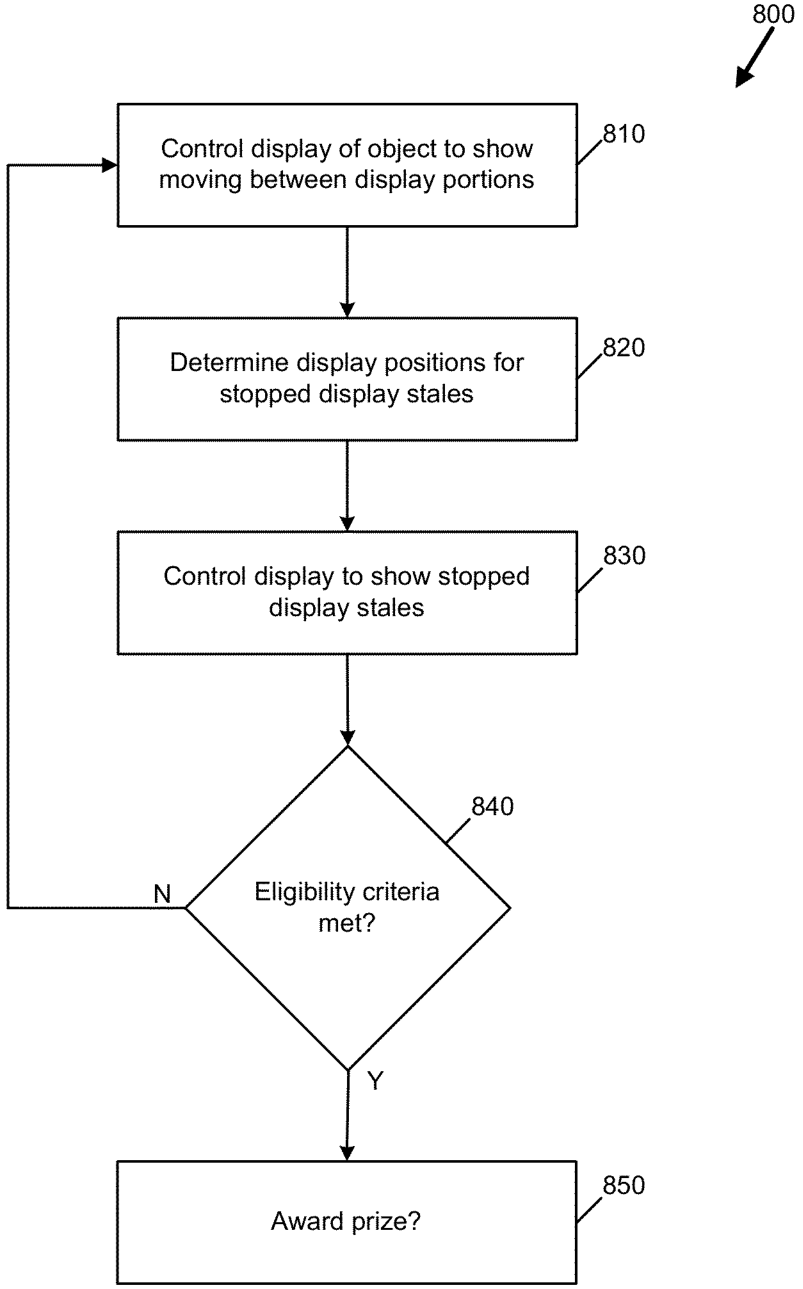
FIG. 8 is a flow chart of an embodiment.

Referring now to FIG. 8, there is shown in summary form the method of the embodiment 800. It will be appreciated that the method involves controlling 810 the display of the object to show it moving between display portions associated with different gaming devices. The method then involves determining 820 display positions for stop display states of the object. It will be appreciated that steps 810 and 820 may be reversed. The display is then controlled to show the stop display states 830. Provided an eligibility criteria is met the 840 the prize is awarded 850. It will be appreciated in this example the eligibility criteria is applied independently of where the object stops. That is, it is possible for a prize to be revealed at a gaming device where the player is not eligible so that the player can be shown that if they have met the eligibility criteria they would have won the bet that won the prize.

Persons skilled in the art will appreciate that in the above embodiment, the display for moving object is provided by the displays of a plurality of different gaming machines. In other embodiments, the display may be provided by a single display, for example an overhead display 160 which shows regions corresponding to each of the gaming devices.

Further aspects of the method will be apparent from the above description of the system. It will be appreciated that at least part of the method will be implemented digitally by a processor. Persons skilled in the art will also appreciate that the method could be embodied in program code. The program code could be supplied in a number of ways, for example on a tangible computer readable storage medium, such as a disc or a memory (for example, that could replace part of memory 103) or as a data signal (for example, by transmitting it from a server). Persons skilled in the art, will appreciate that program code provides a series of instructions executable by the processor.

It will be understood to persons skilled in the art of the invention that many modifications may be made without departing from the spirit and scope of the invention, in particular it will be apparent that certain features of embodiments of the invention can be employed to form further embodiments.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A gaming system comprising:

a display comprising a plurality of display portions associated with respective ones of a plurality of gaming devices; and a group game controller arranged to:

control the display to display an object as moving between the display portions by displaying the object in individual ones of the display portions;

determine display portions at which to display the object in each of a plurality of stopped display states, at least some of which correspond to respective ones a plurality of prizes;

control the display to display the object in each stopped display state in the respective determined display portion; and award any prize associated with each stopped display state to a player of the respective gaming device upon at least one eligibility criterion being met in respect of the gaming device, the at least one eligibility criterion being independent of the display state; and reveal to the player associated with a stopped display state and not meeting the at least one eligibility criterion, what would have been won had the at least one eligibility criterion been met.

2. A gaming system as claimed in claim 1, wherein the at least one eligibility criterion comprises the gaming device being active.

3. A gaming system as claimed in claim 1, wherein the at least one eligibility criterion comprises a qualifying wager being made at the gaming device.

4. A gaming system as claimed in claim 1, wherein each display portion comprises a sub-portion in which the object is displayed when moving, the sub-portion display being independent of display of a game playable with the respective gaming device.

5. A gaming system as claimed in claim 4, wherein display of the object replaces display of the game playable with the gaming device when the object is stopped.

6. A gaming system as claimed in claim 1, wherein the display portions are provided by individual displays of the plurality of gaming devices.

7. A gaming system as claimed in claim 1, comprising a music source connected to at least one speaker, and wherein the group game controller is arranged to control the music source to output music via the at least one speaker while the object is moving.

8. A gaming system as claimed in claim 1, wherein each stopped display state comprises a pair of sub-states, including a conceal state which is displayed initially and a reveal state which is displayed to reveal any prize.

9. A gaming system as claimed in claim 8, wherein the object is a parcel and the conceal state corresponds to a layer of wrapping and the reveal state corresponds to the wrapping being removed.

10. A gaming system as claimed in claim 1, wherein the group game controller is arranged to determine display portions at which to display the object in stopped display states based on data communicated from one or more of the gaming devices.

11. A gaming system as claimed in claim 1, wherein the group game controller comprises a random number generator; and the group game controller is arranged to randomly determine display portions at which to display the object in stopped display states with the random number generator.

12. A method of gaming using a plurality of gaming devices, each for use by a player and each providing display states of an object and having an eligibility requirement independent of any one of the display states, comprising:

controlling a display comprising a plurality of display portions associated with respective ones of a plurality of gaming devices to display an object as moving relative to the display portions by displaying the object in individual ones of the display portions;

determining display portions at which to display the object in each of a plurality of stopped display states, at least some of which correspond to respective ones a plurality of prizes;

controlling the display to display the object in each stopped display state in the respective determined display portion; and awarding any prize associated with each stopped display states to a player of the respective gaming device upon an eligibility criterion being met in respect of the gaming device; and upon the display of the object in a stopped display state and without meeting at least one eligibility criterion, revealing to the player what would have been won had the eligibility criterion been met.

13. A method as claimed in claim 12, wherein the at least one eligibility criterion comprises the gaming device being active.

14. A method as claimed in claim 12, wherein the at least one eligibility criterion comprises a qualifying wager being made at the gaming device.

15. A method as claimed in claims 1, wherein each display portion comprises a sub-portion; and wherein said controlling further comprises displaying the object in the sub-portion when moving and displaying the object in the sub-portion display independently of display of a game playable with the respective gaming device.

16. A method as claimed in claim 15, comprising object replacing display of the game playable with the gaming device when the object is stopped.

17. A method as claimed in claim 12, comprising controlling a music source to output music via at least one speaker while the object is moving.

18. A method as claimed in claim 12, wherein said controlling further comprises displaying the stopped object initially in a conceal and subsequently displaying the object in a reveal state to reveal any prize.

19. A method as claimed in claim 12, comprising determining display portions at which to display the object in stopped display states based on data communicated from one or more of the gaming devices.

20. A method as claimed in claim 12, comprising randomly determining display portions at which to display the object in stopped display states.

21. A group game controller for a gaming system, the group game controller comprising:

a display controller arranged to control a display comprising a plurality of display portions associated with respective ones of a plurality of gaming devices to display an object as moving relative to the display portions by displaying the object in individual ones of the display portions;

a stop position determiner arranged to determine display portions at which to display the object in at least one of a plurality of stopped display states, at least one of which corresponds to a respective one of a plurality of prizes, the display controller further arranged to control the display to display the object in the at least one of the plurality of stopped display states in the respective determined display portion; and a prize awarder arranged to award any prize associated with the stopped display states to a player of the respective gaming device upon an eligibility criterion being met in respect of the gaming device, the eligibility criterion being independent of the display state and to reveal to the player associated with a stopped display state and not meeting the eligibility criterion, what would have been won had the eligibility criterion been met.

22. A group game controller as claimed in claim 21, wherein the at least one eligibility criterion comprises the gaming device being active.

23. A group game controller as claimed in claim 21, wherein the at least one eligibility criterion comprises a qualifying wager being made at the gaming device.

24. A group game controller as claimed in claim 21, comprising a music source connected to at least one speaker, and wherein the group game controller is arranged to control the music source to output music via the at least one speaker while the object is moving.

25. A group game controller as claimed in claim 21, arranged to determine display portions at which to display the object in stopped display states based on data communicated from one or more of the gaming devices.

26. A group game controller as claimed in claim 21, comprising a random number generator, the group game controller arranged to randomly determine display portions at which to display the object in stopped display states with the random number generator.

27. A gaming system as claimed in claim 1, further comprising computer program code.

28. A gaming system as claimed in claim 27, further comprising a tangible computer readable storage medium storing the computer program code.

* * * * *